United States Patent [19]
Ando

[11] Patent Number: 5,362,958
[45] Date of Patent: Nov. 8, 1994

[54] READING APPARATUS WITH POSITION CALCULATION AND FOCUS ADJUSTMENT AND CURVED SURFACE ADJUSTMENT

[75] Inventor: Kazuhisa Ando, Kanagawa, Japan

[73] Assignee: Fuji Xerox Co., Ltd., Tokyo, Japan

[21] Appl. No.: 41,188

[22] Filed: Apr. 1, 1993

[30] Foreign Application Priority Data

Apr. 3, 1992 [JP] Japan .................................. 4-109148
Apr. 8, 1992 [JP] Japan .................................. 4-114296
Aug. 14, 1992 [JP] Japan .................................. 4-237589

[51] Int. Cl.$^5$ ............................................ H01J 40/14
[52] U.S. Cl. ............................. 250/208.1; 250/201.2
[58] Field of Search ................. 250/208.1, 234, 235, 250/236, 201.2; 358/493, 494, 497

[56] References Cited

U.S. PATENT DOCUMENTS 5,003,167  3/1991  Arques ............................. 250/208.1

FOREIGN PATENT DOCUMENTS 3-117965  5/1991  Japan .
4-4666    1/1992  Japan .

OTHER PUBLICATIONS

"3-D Measurement Methods Using Active Illumination Techniques" by Yukio Sato and Kazuo Araki, T. IEE Japan, vol. 107-C, No. 7 1987, pp. 625-631.

"Detection of Three Dimensional Coordinates by PSD Camera with Disturbance Correction of Background Light" by Teizo Aida et al., T. IEEE Japan, vol. 107-C, No. 7, 1987, pp. 632-639.

Primary Examiner—David C. Nelms
Attorney, Agent, or Firm—Finnegan, Henderson, Farabow, Garrett & Dunner

[57] ABSTRACT

In an image reading apparatus, a spot-light position calculator calculates a distance between a document original and a solid state imaging device using the output signals of a light sensing device, which receives a reflected spot light from the original. A image reading section is moved to a read position according to the calculation results, by a drive mechanism. Thereafter, the original is read. A distorted-image processor extends the data on the image on the undulated portion of the original and corrects the density of the extended image data. The data extension and the density adjustment are performed on the basis of the calculation results from the spot-light position calculator.

14 Claims, 14 Drawing Sheets

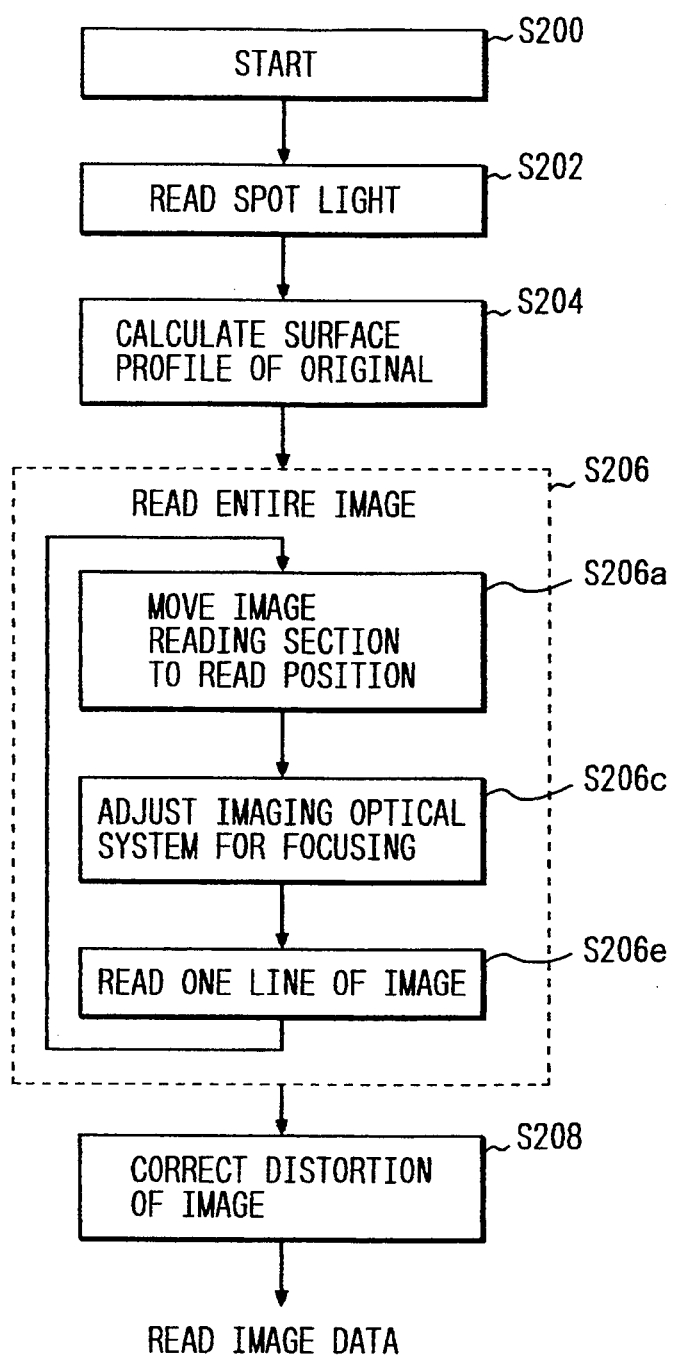

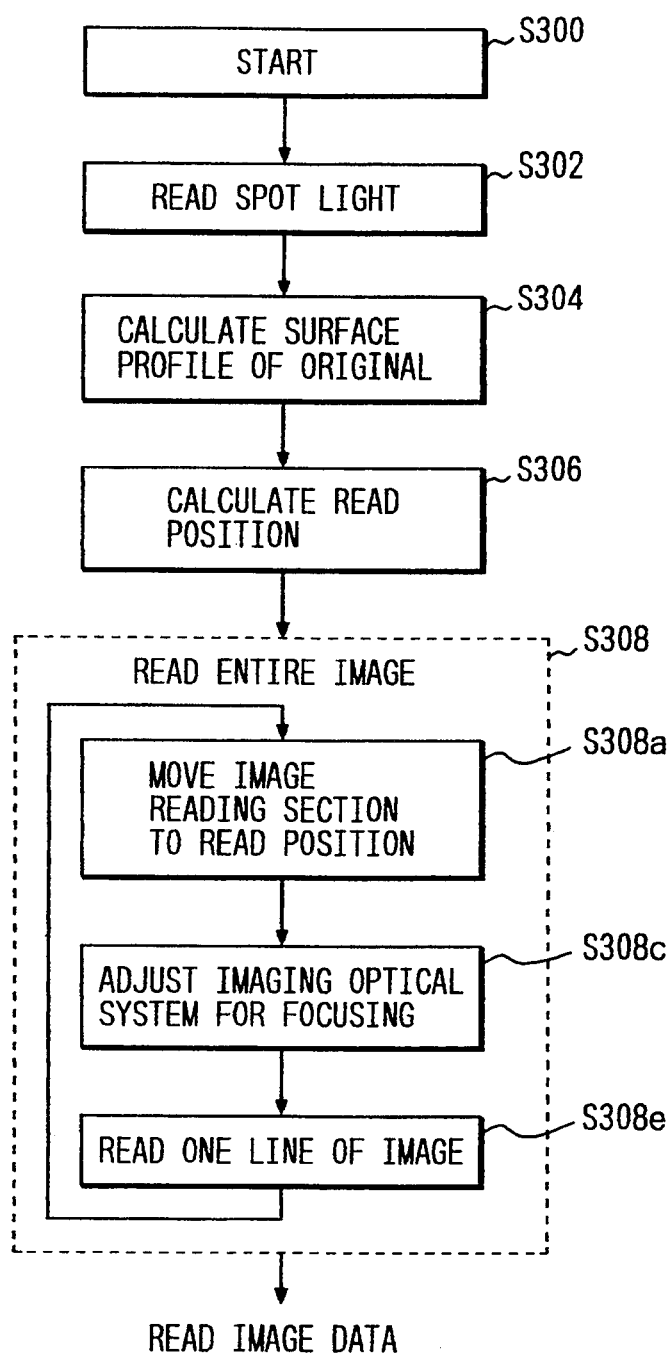

READING APPARATUS WITH POSITION CALCULATION AND FOCUS ADJUSTMENT AND CURVED SURFACE ADJUSTMENT

BACKGROUND OF THE INVENTION

1. Field of the Invention

The present invention relates to an image reading apparatus of the type in which an optical image on a document original is formed on a solid state imaging device by means of an optical imaging means, and the imaging device converts the information of the optical image into corresponding electrical signals. More particularly, the invention relates to an image reading apparatus succeeding in substantially eliminating the blur in the image, which arises from a positional variation of the surface of a document original relative to the solid state imaging device, and the distortion in the image, which arises from the curved surface or the undulation of the document original.

2. Discussion of the Related Art

A conventional image reading apparatus used for facsimile devices, digital copying machines, scanners for personal computers, and the like is shown in FIG. 18.

In the apparatus, as shown, a document original 103 is located on a platen glass (not shown), which constitutes substantially the top surface of a housing 101. A light source 105, a mirror 107, and a lens 109, which cooperate to form a reduction-magnification optical system, and a solid state imaging device 111, such as a charge coupled device (CCD), are disposed within the housing 101.

In the image reading apparatus, light emitted from the light source 105 is reflected by the original 103, and the reflected light passes through the reduction-magnification optical system to form an image of the original on the solid state imaging device 111. The imaging device converts the received light image information into corresponding electrical signals.

Another type of the conventional image reading apparatus is roughly illustrated in FIG. 19. In this apparatus, a light source ].05, and a rod lens array 113, which cooperate to form an equal-magnification optical system, and a contact type sensor 115, are disposed within a housing 101 with a platen glass (not shown) substantially constituting the top surface thereof.

In the image reading apparatus, light emitted from the light source 105 is reflected by the original 103, and the reflected light passes through the equal-magnification optical system to form an image of the original on the contact type sensor 115. The sensor converts the received light image information into corresponding electrical signals.

In the two image reading apparatuses as mentioned above, the processing of signals that are read is based on the presumption that the original entirely contacts with the platen glass. Accordingly, the image reading apparatuses involve the following problems. In a case where the object whose image is to be read is a relatively thick object, such as a book, a portion of a page of the book near the back of the book is curved upward from the platen glass. When the book is put on the platen glass and an image on the page is read, characters, for example, on the corresponding portion of the read image are reduced in size. To avoid this, the image signals obtained must be corrected.

To solve the above problem, there is proposed an image reading technique as shown in FIG. 20. In the figure, a light source 25 emits a line beam in the direction of a spread of a book 5 (horizontal direction in FIG. 20). A cylindrical lens 26 shapes the light beam from the light source 25 into a desired shape of beam. The line beam light emitted from the combination of the light source and the cylindrical lens is reflected by the pages of the book 5, and is imaged on an optoelectric transducing element 28, through a lens 27. A profile of a contour of the page surface is calculated using the output signals of the optoelectric transducing element. The image signals from the curved portion on the pages near the back of the book (FIG. 20) are corrected so as to extend the image thereon in the horizontal direction. As a result, the reproduced image on the curved portion of the book 5 is a little distorted.

The reproduced image, even after extension process for correction, still contains a little blur in the curved portion near the back of the book 5, which is set rising to the platen glass. The reason follows. The extension process for correction is based on the information representative of the surface profile of the original that is read by the line beam light. However, the focal distance of the read sensor to the thick original, or the book, is not adjusted. Accordingly, the surface profile information contains image data read at the improper focal distance.

The correction technique is well adaptable for the image reading apparatus based on the reduction-magnification optical system, but is not suitable for the image reading apparatus of the type which employs the equal-magnification optical system for the size-reduction purposes, because use of the correction technique inevitably brings about increase of the size.

SUMMARY OF THE INVENTION

The present invention has been made in view of the above circumstances and has an object to provide an image reading apparatus which can provide a reproduced image, which is clear, and free of the blur and distortion, irrespective of the curving state of a document original with the platen glass, and further is suitable for the size reduction.

To achieve the above object, the invention provides an image reading apparatus having imaging optical means for imaging on a preset position light reflected from a surface of an object to be read, and image pickup means for picking up an optical image formed at the preset position to convert the optical image into electrical signals, the image reading apparatus including: spot light projecting means for projecting a spot light at a desired position on the surface of the object; reflected light receiving-means for receiving the spot light reflected from the surface of the object to convert the spot light into an electrical signal corresponding to the quantity of the received spot light; position calculating means for calculating a distance between a light receiving surface of the image pickup means and the surface of the object by using the output electrical signal of the reflected light receiving means; focal-distance adjusting means for adjusting relative positions of the imaging optical means and the image pickup means to the surface of the object according to the results of the calculation by the position calculating means while keeping constant the distance between the imaging optical means and the image pickup means; and correcting means for extending image signals representative of the image on a curved or undulated portion of the surface of the object according to the results of the calculation by the position calculating means, and for setting up an optical density of the image on the curved portion according to a density difference between the actual densities of the image data near the extended image data.

Further, the invention provides an image reading apparatus having imaging optical means for imaging on a preset position light reflected from a surface of an object to be read, and image pickup means for picking up an optical image formed at the preset position to convert the optical image into electrical signals, the image reading apparatus including: spot light projecting means for projecting a spot light at a desired position on the surface of the object; reflected light receiving means for receiving the spot light reflected from the surface of the object to convert the spot light into an electrical signal corresponding to the quantity of the received spot light; position calculating means for calculating a distance between a light receiving surface of the image pickup means and the surface of the object by using the output electrical signal of the reflected light receiving means; focal-distance adjusting means for adjusting relative positions of the imaging optical means and the image pickup means to the surface of the object according to the results of the calculation by the position calculating means while keeping constant the distance between the imaging optical means and the image pickup means; and read position determining means for determining read positions of the imaging optical means and the image pickup means according to the distance between the light receiving surface of the image pickup means and the surface of the object, that is calculated by the position calculating means.

Furthermore, the invention provides an image reading apparatus including: imaging optical means for imaging on a preset position light reflected from a surface of an object to be read; image pickup means for picking up an optical image formed at the preset position to convert the optical image into electrical signals; scanning means for turning the combination of the imaging optical means and the image pickup means in two directions orthogonal to each other while keeping the fixed relative position of the imaging optical means to the image pickup means; spot light projecting means for projecting a spot light at a desired position on the surface of the object; surface profile calculating means for calculating a profile of the surface of the object using the output signals of the image pickup means which receives the reflected spot light from the object; focus adjusting means for adjusting the focal distance of the imaging optical means using the results of the calculation by the surface profile calculating means; and correcting means for extending image signals representative of the image on a curved or undulated portion of the surface of the object according to the results of the calculation by the surface profile calculating means, and for setting up an optical density of the image on the curved portion according to a density difference between the actual densities of the image data near the extended image data.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 3 is a flowchart showing a sequence of procedural steps for image reading and processing, which is performed by a microprocessor in the image reading apparatus;

FIG. 9 is a flowchart showing a sequence of procedural steps for image reading and processing, which is performed by a microprocessor in the image reading apparatus;

DETAILED DESCRIPTION OF THE PREFERRED EMBODIMENTS

An image reading apparatus according to a first embodiment of the present invention will be described with reference to FIGS. 1 through 7. The arrangement of the image reading apparatus and an external appearance of the same are shown in FIGS. 1 and 2, respectively.

Figure 1:
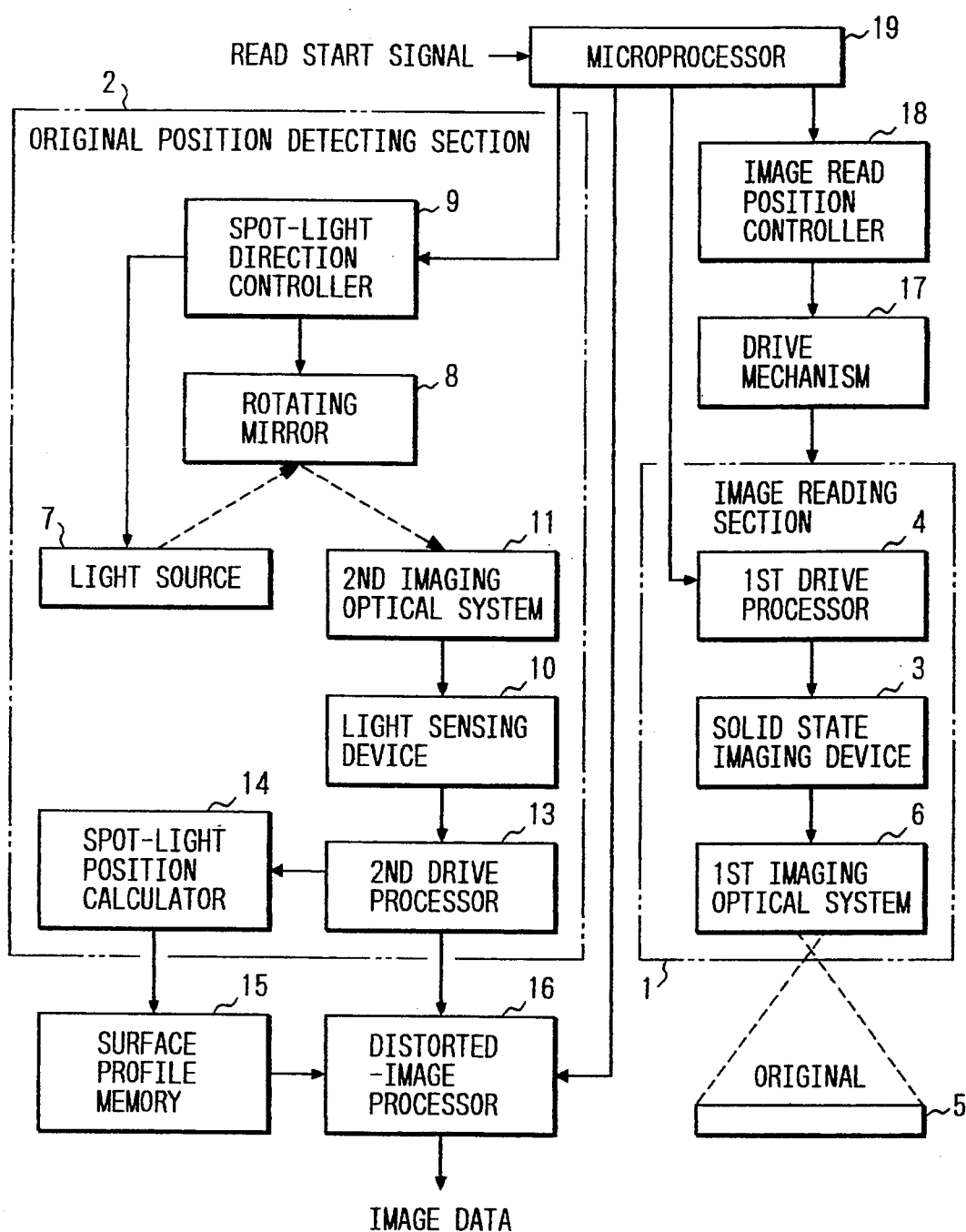
FIG. 1 is a block diagram showing the arrangement of an image reading apparatus according to a first embodiment of the present invention.
Figure 2:
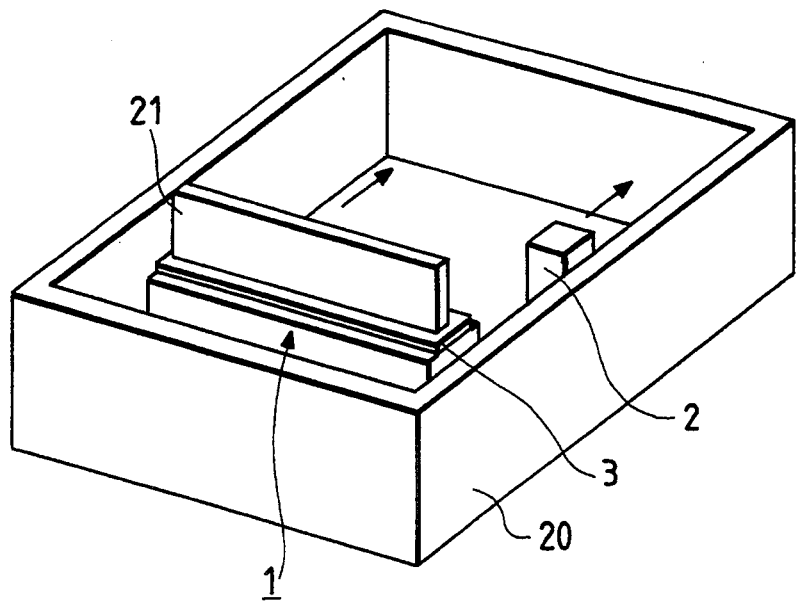
FIG. 2 is a perspective view showing an external appearance of the image reading apparatus of FIG. 1.

As shown in FIG. 1, the arrangement of the image reading apparatus may be roughly divided into an image reading section 1 and an original position detecting section 2.

The image reading section 1 includes a solid state imaging device 3, which may be a charge coupled device (CCD), a first drive processor 4 for controlling the solid state imaging device 3, and a first imaging optical system 6 including a condenser for condensing reflecting light from a document original 5.

The original position detecting section 2 includes a light source 7 for emitting spot light, a rotating mirror 8 for reflecting the spot light from the light source 7, a spot-light direction controller 9 for controlling the turn of the rotating mirror 8, a second imaging optical system 11 for imaging the reflected light from the original 5 on a light sensing device 10 by way of the rotating mirror 8, the light sensing device 10 as a reflected light sensing means for converting the information of an image formed thereon into electrical signals, a second drive processor 13 for applying the electrical signals from the light sensing device 10 to a spot-light position calculator 14, at proper timings and in proper signal levels, and the spot-light position calculator 14 as a position calculating means for calculating a position of the spot light using the output signals of the light sensing device 10, that are received from the second drive processor 13. In the first embodiment, the light source 7, the rotating mirror 8, and the spot-light direction controller 9 make up a spot-light projecting means.

Additionally, the image reading apparatus includes a surface profile memory 15 for storing the results of calculation from the spot-light position calculator 14, a distorted-image processor 16 for correcting a distortion of the image using data on the spot-light position read out of the surface profile memory 15, a drive mechanism 17 as a focal point adjusting means for moving the image reading section 1, and an image read position controller 18 for controlling the operation of the drive mechanism 17. A microprocessor 19, further contained in the image reading apparatus, controls the operations of the image reading section 1, the original position detecting section 2, the distorted-image processor 16, and the image read position controller 18.

The external view of the image reading apparatus of FIG. 1 is perspectively illustrated in FIG. 2.

As shown, the image reading section 1 and the original position detecting section 2, disposed within a housing 20, are movable in the direction of arrows, viz., the direction in which an image on the original is read. The image reading section 1 includes the solid state imaging device 3 and a focusing, rod lens array 21 as one of the components of the first imaging optical system 6. The original position detecting section 2 is located near to the side edge of the original.

A sequence of procedural steps for the image reading and processing, which is performed by the microprocessor 19 in the image reading apparatus, will be described with reference to FIG. 3.

To start, the microprocessor 19 responds to a read start signal from a start switch, not shown, that is pushed, to start the procedure for image reading and processing (step S200). The microprocessor 19 drives the light source 7 to emit a spot light. The spot light is projected to the original by way of the rotating mirror 8, e.g., a polygon mirror shaped like a hexagonal prism, and reflected by the original. The reflected light is received for a spot-light reading operation (step S202). The spot-light reading operation is performed while moving the original position detecting section 2 in the arrow direction in FIG. 2. The mechanisms for driving the original position detecting section 2 to move in the arrow direction and the vertical direction will be described later with reference to FIG. 6(a).

Following the spot-light reading operation, the microprocessor 19 calculates a surface profile of the original using the signals obtained (step S204). The surface profile calculation process will be described later in detail with reference to FIG. 4. After this step, an image on the original is entirely read (step S206).

The process to read the entire original image follows. The image reading section 1 is moved to an original read position by the drive mechanism 17 (step S206a). In this position, the focal distance of the first imaging optical system 6 to the original 5 is adjusted on the basis of the results of the calculation for original surface profile that is carried out in step S204 (step 206c). In the focal distance adjustment, a distance between the rod lens array 21 in the first imaging optical system 6 and the solid state imaging device 3 is kept constant. A distance between the rod lens array 21 and the original is adjusted according to the results of the surface profile calculation in a manner that the image reading section 1 is vertically moved to the document original.

Following the focal distance adjustment, the image reading section 1 reads the image by one line (step S206e). Then, the distorted-image processor 16 returns to step S206a, and repeats a similar procedural process for the remaining lines.

After completion of the operation for reading the entire original image in step S206, the image signals thus collected will undergo a distortion correcting process (step S208). Finally, the read image signals thus processed are output as the output image signals from the image reading apparatus. The distortion correcting process of the step S208 will be described later in detail with reference to FIG. 5.

The drive mechanisms for moving the image reading section 1 for the entire image reading operation and the focal distance adjustment will subsequently be described with reference to FIGS. 6(b) and 7.

The principle for calculating the surface profile of the document original that is referred to in step S204 in the flowchart of FIG. 3 will be described in detail with reference to FIG. 4.

Figure 4:
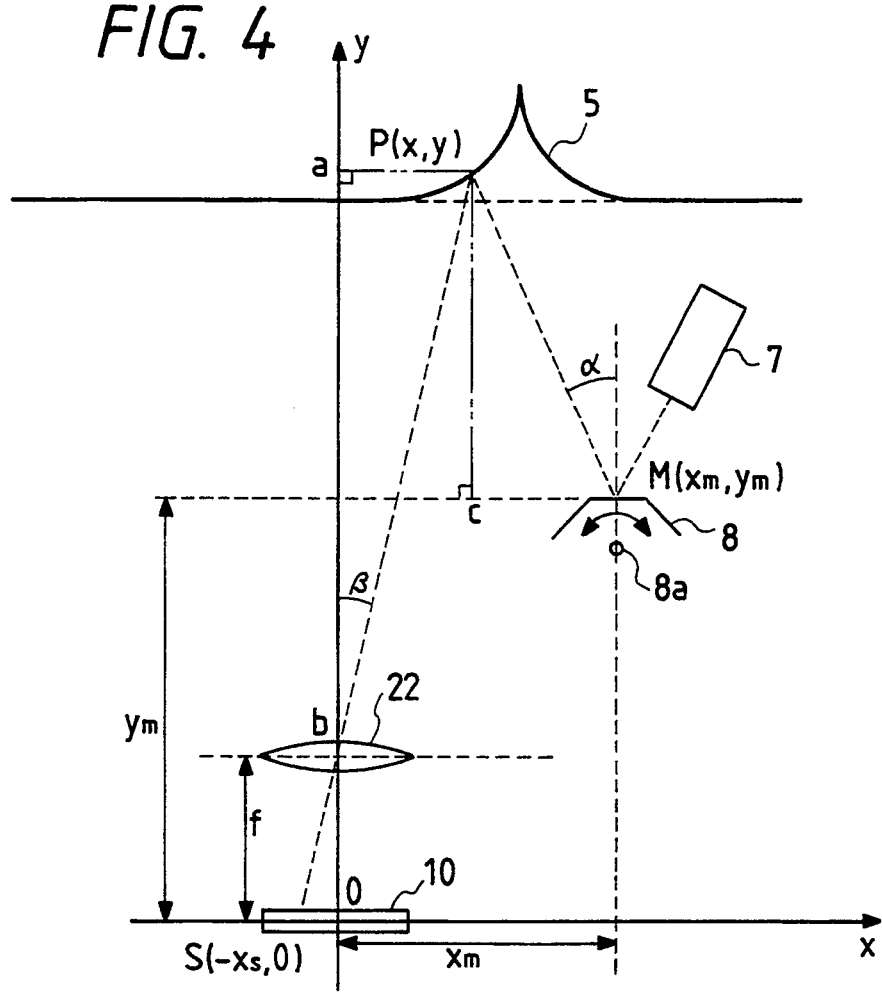
FIG. 4 is an explanatory diagram useful in explaining the calculation for obtaining the surface profile of a document original, which is performed by an original position detecting section in the image reading apparatus.

In FIG. 4, a profile shaped like a mountain (indicated by a bold solid line), located in the upper portion of the figure, indicates a contour of the surface of a document original placed on the platen glass when viewed in the direction orthogonal to the direction for reading the original image (see FIG. 2). In the specification, this surface contour profile is defined as a "surface profile".

A lens 22 of the second imaging optical system 11 is disposed relative to the light sensing device 10 such that the optical axis of the lens 22 passes through the center of the light sensing device 10.

In FIG. 4, the center of the light sensing device 10 lies at the origin of the two-dimensional coordinates defined by X and Y axes. The distance between the lens 22 and the light sensing device 10 as measured in the Y axis is denoted as f. The Y axis is coincident with the optical axis of the lens 22. In FIG. 4, a rotating shaft 8a of the polygon mirror 8 extends in the direction orthogonal to the surface of the drawing. A distance of the rotating shaft 8a from the origin in the X axis is denoted as $x_m$. A distance of the center of the mirrored facet of the polygon mirror from the original in the Y axis is denoted as $y_m$. The center M or the reflecting point of the mirrored facet of the polygon mirror, by which a spot light from the light source 7 is reflected, is represented by the coordinates ($x_m$, $y_m$).

The spot light is incident on the reflecting point M of the polygon mirror 8 and reflected at a reflecting angle $\alpha$, and incident on the surface of the original. The incident point P on the original surface is expressed by the coordinates P(x, y). The incident point P also serves as a reflecting point. The spot light emanating from the reflecting point advances at an angle $\beta$ to the Y axis, passes through the lens 22 and hits the surface of the light sensing device 10. The incident point on the surface of the device is expressed as S($-x_s$, 0). On the assumption as mentioned above, let us obtain the Y coordinate value of the incident point P on the original 5, viz., the distance y between the light sensing device 10 and the original 5.

The position $x_m$ of the rotating shaft 8a of the polygon mirror 8 on the X axis is the sum of the side Pa of a triangle Pab in FIG. 4 (here, b indicates the center point of the lens 22) and the side Mc of a triangle PcM. Then, we have $$x_m = (y-f)\tan\beta + (y-y_m)\tan\alpha \quad (1)$$

where $$\tan\beta = x_s/f \quad (2)$$

Rearranging the equation (1) for % and substituting the equation (2) into the rearranged equation, then we have $$y = (x_m + y_m \cdot \tan\alpha + x_s)/(\tan\alpha + x_s/f) \quad (3)$$

The results of the calculation of the above equation are stored in the surface profile memory 15. In the step (S206c in FIG. 3) of the focal distance adjustment in the operation of reading the entire original image, the calculation results are read out of the memory and used for adjusting the distance from the image reading section 1, more exactly the rod lens array 21, to the original 5. As a result, the image reading section 1 reads the image while keeping the best focal distance relative to the original.

The principle of the distortion correction referred to in step S208 in FIG. 3 will be described in detail with reference to FIGS. 5(a) and 5(b). In the case of a document original which includes a portion curved upward from the platen glass as shown in FIG. 5, when it is placed on the platen glass, the image on the curved portion can be read without any blur since the focal distance adjustment is made as described above. The image of this portion is reduced in size, so that the entire image, when reproduced, has a distortion. This image distortion is corrected by the distortion correction process.

Figure 5A:
FIGS. 5(a) and 5(b) are graphs showing the relationships of actual and calculated relative positions of the surface of the original to the reference surface vs. the movement of the image reading section, the graphs being useful in explaining the process for correcting a distortion of an image.
Figure 5B:
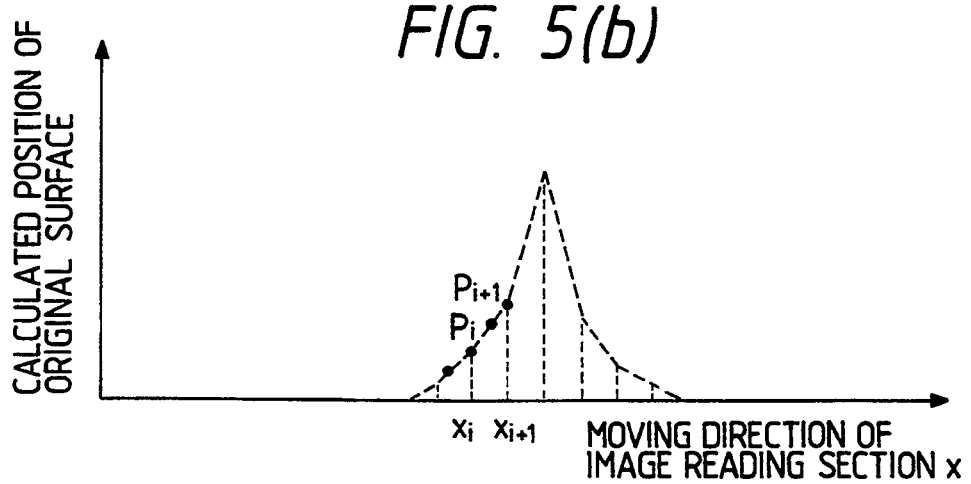

A profile of the contour of the surface of an actual original placed on the platen glass, when viewed in the direction orthogonal to the scanning direction for image reading as in the case of FIG. 4 is shown in FIG. 5(a) FIG. 5(b) is an approximate profile plotted using the data on the surface profiles which are collected by the original position detecting section 2.

The distortion correction will be described using typically the surface profile values at two points $x_i$ and $x_{i+1}$ on the X axis along which the image reading section 1 moves. The two points lie at the positions of pixels. It is assumed that the coordinates at the point $x_i$ is $P_i$, and the coordinates at the point $x_{i+1}$ is $P_{i+1}$. As shown, the surface is curved between the points $x_i$ and $x_{i+1}$. If the surface is straightly stretched, the pixels must be present at more than the two points $x_i$ and $x_{i+1}$. The number of pixels if the coordinates $P_i$ and $P_{i+1}$ lie on the X axis, viz., the original laid on the platen is straight, not curved, can be expressed by $$|P_i, P_{i+1}|/|x_i, x_{i+1}|$$

where $|P_i, P_{i+1}|$ represents a distance between the two coordinates $P_i$ and $P_{i+1}$ if the original is straight, and $|x_i, x_{i+1}|$) represents a distance between two adjacent pixels.

Read values (density values) of the respective pixels, which would be calculated if the original surface is straight, are obtained by using an interpolation method. For simplicity, it is assumed that two types of density distribution exist, the halftone portion where the density smoothly varies, and the edge portion where the density steeply varies, such as characters and lines. It is further assumed that a density value at $P_i$ is $I_i$ and a density value at $P_{i+1}$ is $I_{i+1}$, and a density difference between the two coordinates is $|I_i - I_{i+1}|$. In the process for the distortion correction, it is determined whether the density difference is larger or smaller than a preset value $\theta$. If it is larger than the preset value $\theta$, the density distribution between the coordinates $P_i$ and $P_{i+1}$ is considered to be the edge portion. Two density values are unconditionally assigned to the densities of the pixels present between the coordinates $P_i$ and $P_{i+1}$ in a manner that Ii is assigned to the pixels positioned closer to $P_i$ with respect to the mid point between $P_i$ and $P_{i+1}$ are determined to be $I_i$, and $I_{i+1}$, to the pixels positioned closer to $P_{i+1}$.

When the density difference $|I_i - I_{i+1}|$ is smaller than the preset value $\theta$, the density distribution is considered to be the halftone portion. If the number of pixels ($|P_i, P_{i+1}|/x_i, x_{i+1}|$) calculated is n, a density value $I_k$ of the k-th pixel (k=1 to n) is given by $$I_k = I_i + \{(I_{i+1} - I_i)/(n+1)\} \times k.$$

For the subsequent intervals between the adjacent coordinates, a similar interpolation process is repeatedly applied. The instant distortion correction functions to expand the image data on the curved portion of the original, that are read in a reduced manner, and to set up the densities in the expanded image portion according to the density difference of the pixels before extended.

The drive mechanism for driving the original position detecting section 2 to move in the arrow direction (FIG. 2) will be described with reference to FIG. 6(a).

Figure 6A:
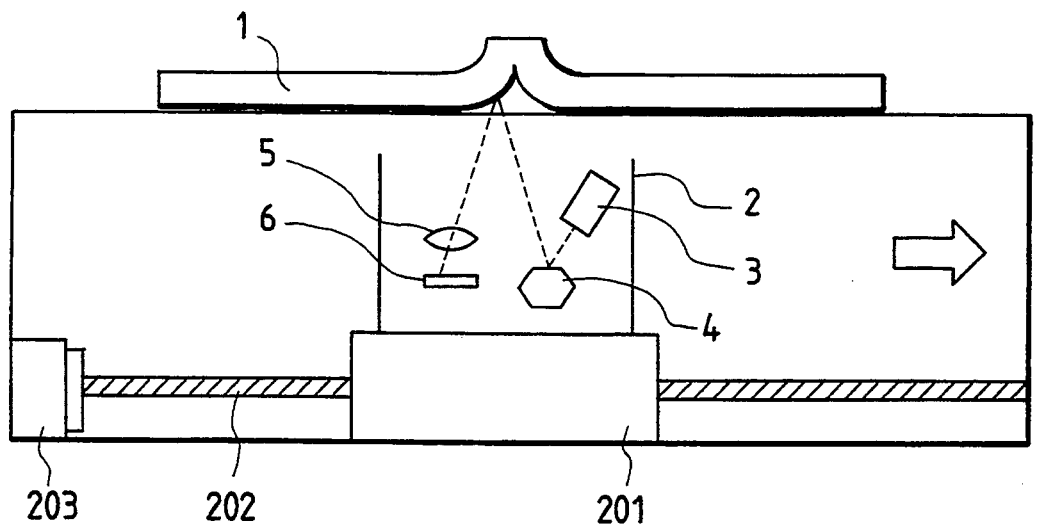
FIGS. 6(a) and 6(b) are side views for explaining a drive mechanism for the original position detecting section.

As shown in FIG. 6(a), the original position detecting section 2 is mounted on a mount bracket 201. The mount bracket 201 is fitted around a spiral shaft 202 in a manner that when the spiral shaft 202 is rotated, the original position detecting section 2 moves in the arrow direction. The spiral shaft 202 is coupled with a rotating shaft of a drive motor 203, which is provided for the original position detecting section 2. Under control of the microprocessor 19, the drive motor 203 turns to feed the original position detecting section 2 at a constant speed in the arrow direction.

The drive mechanism for driving the image reading section 1 to move in the arrow direction (FIG. 2) for the entire image reading operation will be described with reference to FIGS. 6(b) and 7.

Figure 6B:
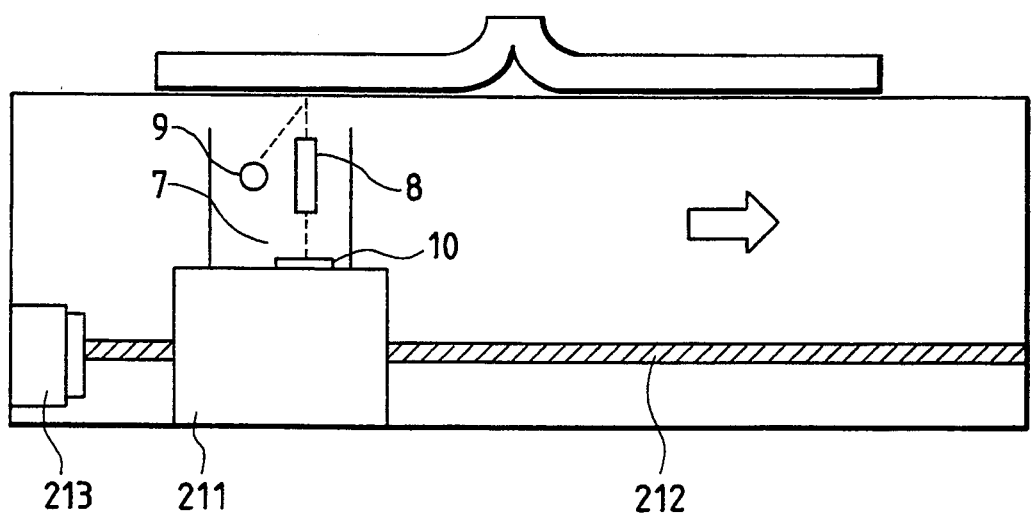

As shown in FIG. 6(b), the image reading section 1 is mounted on a mount bracket 211. The mount bracket 211 is fitted around a spiral shaft 212 in a manner that when the spiral shaft 212 is rotated, the image reading section 1 moves in the arrow direction. The spiral shaft 212 is coupled with a rotating shaft of a drive motor 213, which is provided for the image reading section 1. Under control of the microprocessor 19 which receives a drive control signal from the first drive processor 4, the drive motor 213 turns to feed the image reading section 1 in the arrow direction. A speed of the movement of the image reading section 1 depends on the results of the original-position detection.

The drive mechanism for vertically moving the image reading section 1 for the focal distance adjustment will be described with reference to FIG. 7.

As shown, imaging optical means is mounted on a mount bracket 221. The mount bracket 221 is fitted around a spiral shaft 222 in a manner that when the spiral shaft 222 is rotated, the imaging optical means vertically moves for the focal distance adjustment. The spiral shaft 222 is coupled with a rotating shaft of a drive motor 223, which is provided for the focal distance adjustment. Under control of the microprocessor 19 which receives a control signal from the first drive processor 4, the drive motor 223 turns to move the imaging optical system in the vertical direction, in synchronism with the image reading operation, according to the results of the original position detection.

As described above, in the image reading apparatus, the original position detecting section 2 for detecting a state of a portion of a document original where is curved upward from the surface of the platen glass, calculates the surface profile of the curved portion of the original before the image reading operation. When the image reading section 1 reads an image on the original, a focal distance of the image reading section 1 to the original is adjusted using the surface profile data calculated. This feature ensures the reading of the original image constantly at proper focal distances. The distorted-image processor 16 extends the image data, which are collected in a size-reduced manner, and sets up the optical density of the extended image data according to the density difference between the actual densities of the image data near the extended image data. Accordingly, the image reading apparatus of the invention can reproduce the image data on the curved portion of the original in the form of a clear, distortion-free image.

In other words, in the image reading apparatus of the invention, a spot light is projected to the surface of a document original. The surface profile of the original is obtained using the spot light reflected from the original surface. A focal distance of the means for picking up an image to the original surface is obtained according to the surface profile obtained. The image on the curved portion of the original is extended. The optical density of the extended image is set up according to the density difference between the densities of the images near the extended image. Accordingly, the original image is read constantly at proper focal distances, eliminating the blur in the reproduced image. Further, the image of the curved portion is extended and density adjusted, so that the reproduced image of the curved portion is clear and free from distortion.

An image reading apparatus according to a second embodiment of the present invention will be described with reference to FIGS. 8 through 12. The external appearance of the image reading apparatus of the second embodiment is the same as that of the first embodiment shown in FIG. 2, and hence description of it will not be given.

Figure 8:
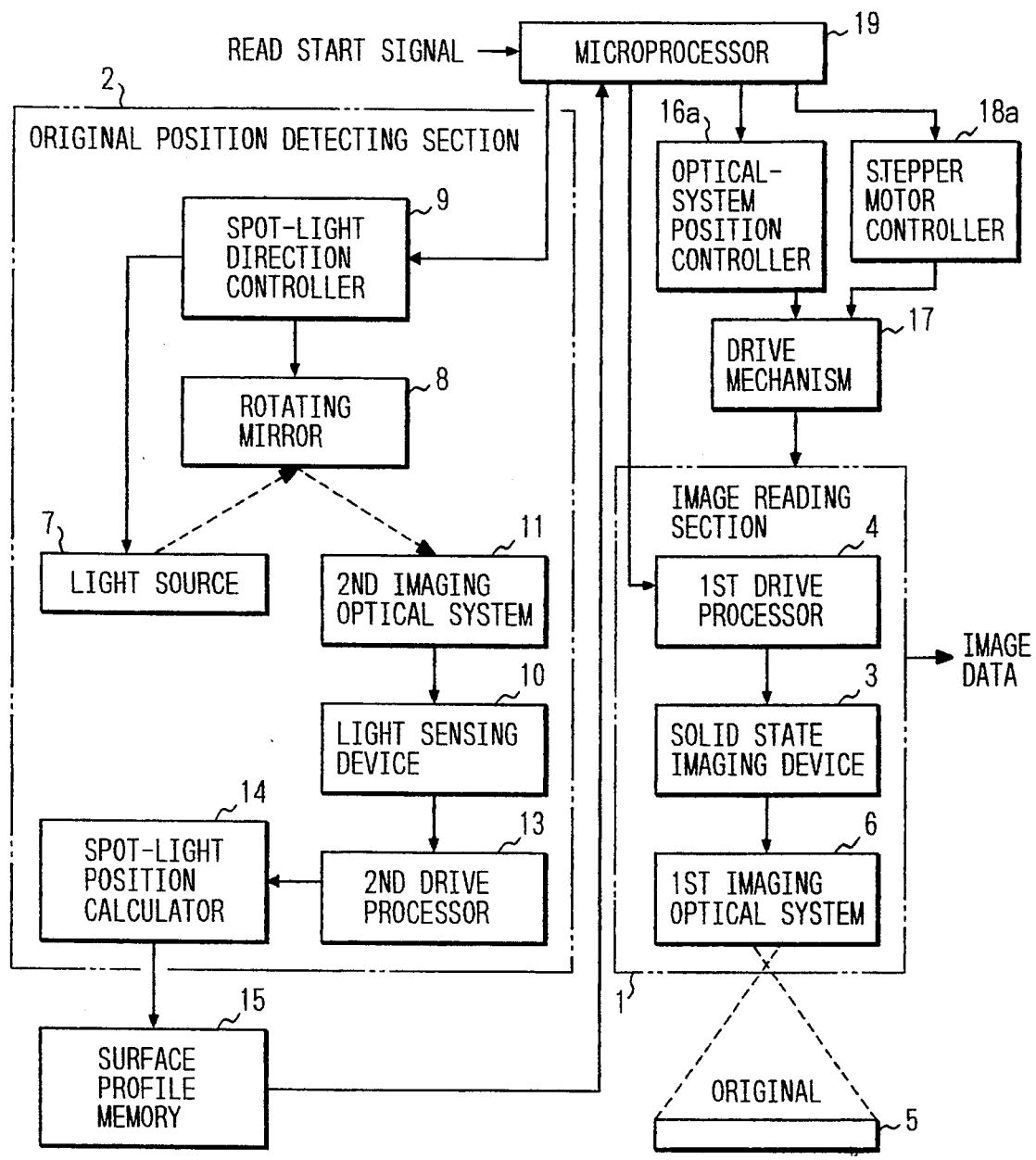
FIG. 8 is a block diagram showing the arrangement of an image reading apparatus according to a second embodiment of the present invention.

As shown in FIG. 8, the arrangement of the image reading apparatus may also be roughly divided into an image reading section 1 and an original position detecting section 2.

The image reading section 1 includes a solid state imaging device 3, which may be a charge coupled device (CCD), a first drive processor 4 for controlling the solid state imaging device 3, and a first imaging optical system 6 including a condenser for condensing reflecting light from a document original 5.

The original position detecting section 2 includes a light source 7 for emitting spot light, a rotating mirror 8 for reflecting the spot light from the light source 7, a spot-light direction controller 9 for controlling the turn of the rotating mirror 8, a second imaging optical system 11 for imaging the reflected light from the original 5 on a light sensing device 10 by way of the rotating mirror 8, the light sensing device 10 as a reflected light sensing means for converting the information of an image formed thereon into electrical signals, a second drive processor 13 for applying the electrical signals from the light sensing device 10 to a spot-light position calculator 14, at proper timings and in proper signal levels, and the spot-light position calculator 14 as a position calculating means for calculating a position of the spot light using the output signals of the light sensing device 10, that are received from the second drive processor 13. In the first embodiment, the light source 7, the rotating mirror 8, and the spot-light direction controller 9 make up a spot-light projecting means.

The image reading apparatus further includes a surface profile memory 15 for storing the results of calculation from the spot-light position calculator 14, a drive mechanism 17, an optical-system position controller 16a, and a stepper motor controller 18a. The drive mechanism 17 has two functions, the function to move the image reading section 1 in the slow scanning direction (indicated by solid lines on the bottom of the housing 20 in FIG. 2), and the function to adjust the focal distance of the optical system to the original surface. The stepper motor controller 18a controls the drive of a stepper motor (not shown) in the drive mechanism 17. In response to an instructive signal from the microprocessor 19, the optical-system position controller 16a controls the drive mechanism 17 to move the first imaging optical system 6 relative to the original 5 so that the optical system has the best focal distance.

The microprocessor 19 controls the whole system of the image reading apparatus, more specifically, the operation of the image reading section 1, and the like under control of programs, which will subsequently be described.

A sequence of procedural steps for the image reading and processing, which is performed by the microprocessor 19 in the image reading apparatus, will be described with reference to FIG. 9.

To start, the microprocessor 19 responds to a read start signal from a start switch, not shown, that is pushed, to start the procedure for image reading and processing (step S300). The microprocessor 19 drives the light source 7 to emit a spot light. The spot light is projected to the original by way of the rotating mirror 8, e.g., a polygon mirror shaped like a hexagonal prism, and reflected by the original. The reflected light is received for a spot-light read operation (step S302). The spot-light reading operation is performed while moving the original position detecting section 2 in the arrow direction in FIG. 2. Specifically, the spot light is read every time the original position detecting section 2 is moved at a fixed pitch d.

The mechanism for driving the original position detecting section 2 to move in the arrow direction is as illustrated in FIG. 6(a).

Figure 10A:
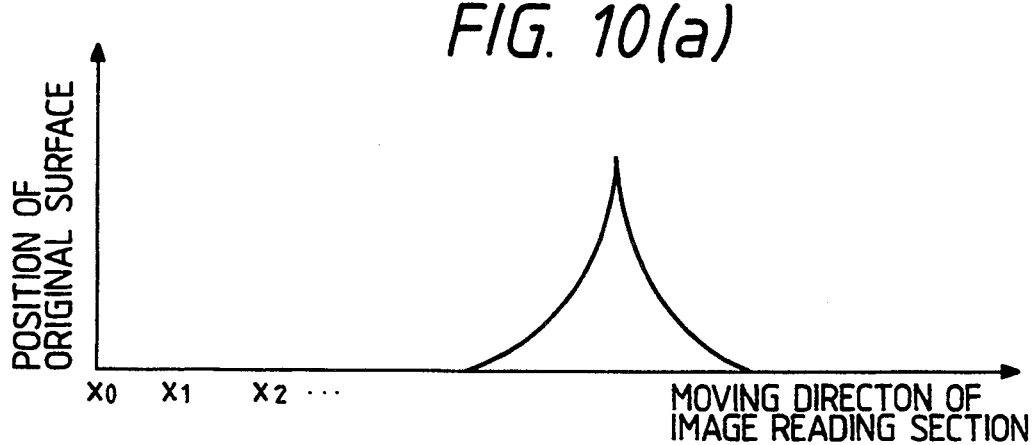
FIGS. 10(a) and 10(b) are graphs showing the relationships of actual and calculated relative positions of the surface of the original to the reference surface vs. the movement of the image reading section, the graphs being useful in explaining the calculation of a read position.
Figure 11:
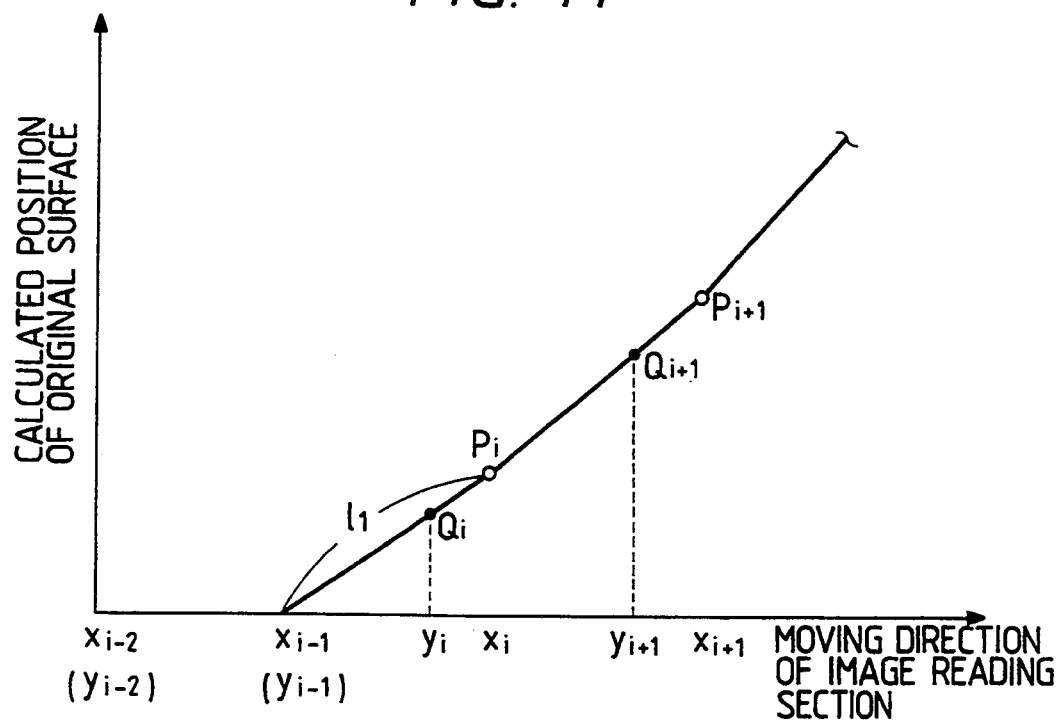
FIG. 11 is a graph showing the calculated relative positions of the original surface to the reference surface in an enlarge fashion.
Figure 12:
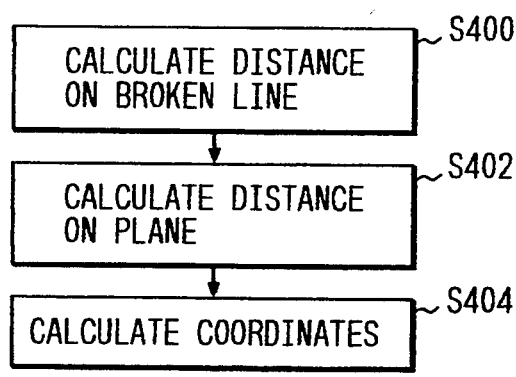
FIG. 12 is a flowchart showing the process for the read position calculation.

Following the spot-light reading operation, the microprocessor 19 calculates a surface profile of the original using the signals obtained (step S304) as described with reference to FIG. 4, and further calculates original read positions using the results of the surface profile calculation (step S306) as will be described later in detail with reference to FIGS. 10 through 12.

After this step, an image on the original is entirely read (step S308). The process to read the entire original image follows. The image reading section 1 is moved to an original read position by the drive mechanism 17 (step S308a). In this position, the focal distance of the first imaging optical system 6 to the original 5 is adjusted on the basis of the results of the calculation for original surface profile that is carried out in step S304. In the focal distance adjustment (step S308c), while a distance between the rod lens array 21 in the first imaging optical system 6 and the solid state imaging device 3 is kept constant, a distance between the rod lens array 21 and the original is adjusted according to the data of a new original read position that is obtained using the results of the surface profile calculation, in a manner that the image reading section 1 is vertically moved to the document original.

Following the focal distance adjustment, the image reading section 1 reads the image by one line (step S308e). Then, microprocessor 19 returns to step S308a, and repeats a similar procedural process for the remaining lines.

After completion of the operation for reading the entire original image in step S308, the image signals thus collected are output from the image reading apparatus. The surface profile calculation in step S304 is the same as that in the first embodiment already described.

Figure 7:
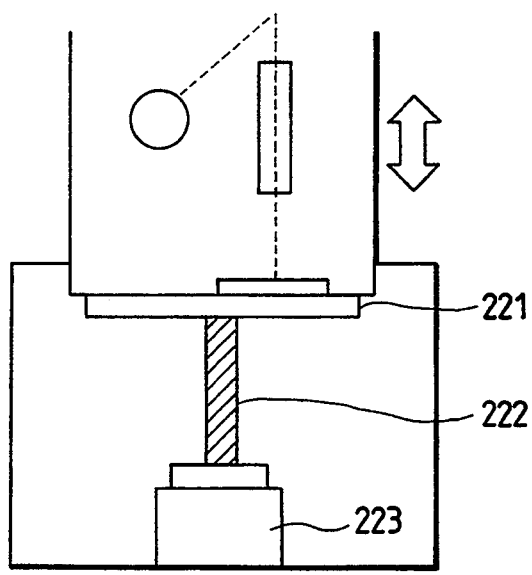
FIG. 7 is a side view for explaining a drive mechanism for an image reading section in the image reading apparatus.

The drive mechanisms for moving the image reading section 1 for the image reading operation and for the focal distance adjustment is as illustrated in FIGS. 6(b) and 7.

The principle of the original read position calculation referred in step S306 in FIG. 9 will be described in detail with reference to FIGS. 10(c) and 11.

Figure 10B:
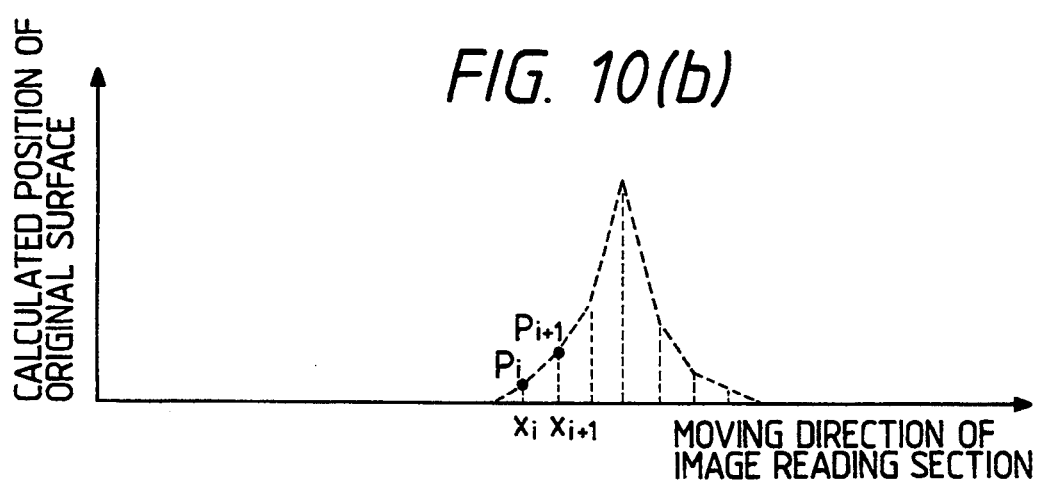
Figure 10C:
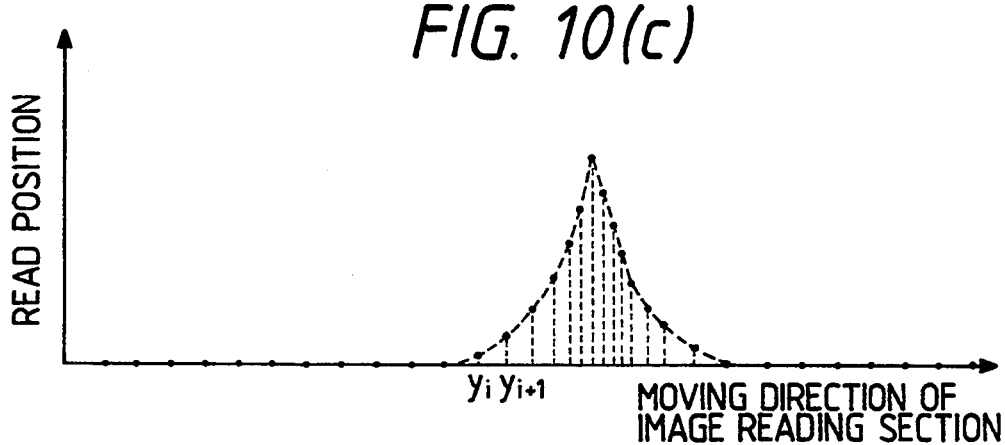
FIG. 10(c) is a graph showing the relationship of a read position on the original as viewed in the slow scanning direction vs. the movement of the image reading section, the graph being useful in explaining the calculation of a read position.

In the read position calculation process, a position of the image reading section 1 when seen in the slow scanning direction is calculated on the basis of the surface profile previously obtained (in step S304 in FIG. 9 and see FIG. 10(b)).

A profile of the contour of the surface of an actual original placed on the platen glass, when viewed in the direction orthogonal to the scanning direction for image reading is shown in FIG. 10(a). FIG. 10(b) is an approximate profile plotted using the data on the surface profile, which are collected by the original position detecting section 2.

The original read position is calculated in the following way. The calculated relative positions of the surface of the original to the reference surface or the platen glass is graphically illustrated in an enlarge fashion in FIG. 11. The graph of FIG. 11 constitutes a part of that of FIG. 10(b). In the figure, $x_{i+1}$ represents a point on the original, which is coincident with the reference surface. The pitch at which the original position detecting section 2 is moved in the spot light read process (S302 in FIG. 9) is d. A distance from the point $x_{i-1}$ to a point $P_i$ on the original is $l_1$. Original read positions to be calculated are $y_n$ (n=0, 1, 2, ...).

Within the range of points $x_0$ to $x_{i-1}$, the original is in close contact with the platen glass. Accordingly, $y_0$, $y_1$, $y_{i+1}$ are coincident with $x_0$, $x_1$, ..., $x_{i-1}$, respectively. If $l_1 > d$, $y_1$ lies in a line segment $x_{i-1}P_i$. The coordinates $y_i$ in the image reading section moving direction (the abscissa in FIG. 11) of a point $Q_i$ where the segment $x_{i-1}Q_i = d$ is the read position to be calculated. The subsequent read position $y_{i+1}$ is obtained by finding a point $Q_iP_i$, where $Q_iQ_{i+1} = d$ on the extension of the segment $Q_iP_i$, and then the X coordinates of the point $Q_{i+1}$ as for the point $Q_i$. If $d > Q_iP_i$, a point $Q_{i+1}$ where $Q_iQ_{1+1} = d$ holds on the line segment $P_1P_{i+1}$ is obtained. For $y_{i+2}$ and the subsequent ones, a calculation process similar to that of $y_{i+1}$ is repeated.

The original read positions $y_n$ thus calculated can be considered as the positions on the line extending in the reference surface direction when the original raised from the reference surface is stretched over the reference surface. The read positions $y_n$ are linearly arrayed at unequal pitches, as the results of the calculation (see FIG. 10(c)).

The process for the read position calculation will briefly be described with reference to FIG. 12.

To begin, a distance between intended two points on a line segment is calculated (step S400). As in the previous case, the distance between the points $x_0$ and $P_i$ and the distance between the points $P_i$ and $P_{i+1}$ are calculated.

After the distance calculation on the line segment, a distance on a plane is calculated (step S402). In the previous case, the distance between the points $y_i$ and $y_{i+1}$ is calculated. Finally, the coordinates calculation is performed (step S404). In the previous case, the calculation of the distance from the start point $x_0$ corresponds to the coordinate calculation.

In the second embodiment, the surface profile of the original, viz., a curving state of the portion of the original where is curved upward from the reference surface or the platen glass, is obtained by the original position detecting section 2. The positions of the image reading section 1 as viewed in the slow scanning direction are determined according to the state of the curved portion of the original. At each read position, the image reading section reads the image of the curved portion of the original at the focal distance adjusted. Accordingly, the image reading apparatus of the second embodiment is improved over the apparatus of the first embodiment in which the image data of the curved portion is extended on the basis of the surface profile, in that the best focal distance of the image reading section can be more reliably maintained throughout the image reading operation. Accordingly, the image reproduced is free from the blur and the distortion.

Thus, in the image reading apparatus of the second embodiment, the surface profile of the original is obtained before the image on the original is read. That is, a spot light is projected on the original and the reflected light from the original is used for obtaining the surface profile data. The original read positions are calculated on the basis of the surface profile. The focal distance of the optical system in the image reading section is adjusted on the basis of the surface profile data. When comparing with the image reading apparatus of the first embodiment, the image reading apparatus of the second embodiment is simpler in construction since there is no need of complicated signal processings for the data extension. Since the image is reproduced under the best focal conditions, the reproduced image is a faithful copy of the original image not blurred and distorted.

An image reading apparatus according to a third embodiment of the present invention will be described with reference to FIGS. 13 through 17. The arrangement of the image reading apparatus and an external appearance of the same are shown in FIGS. 13 and 14, respectively.

Figure 13:
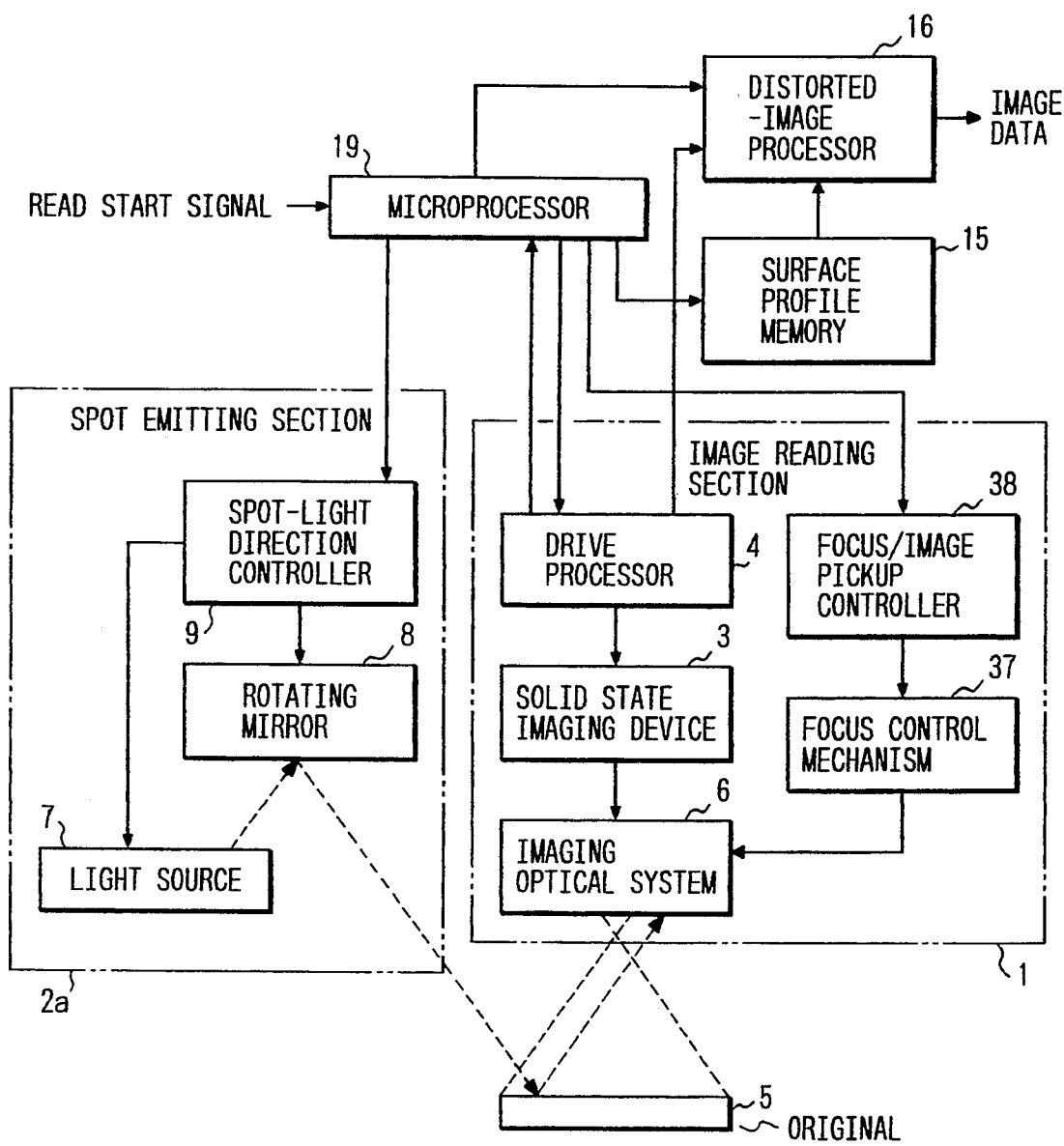
FIG. 13 is a block diagram showing the arrangement of an image reading apparatus according to a third embodiment of the present invention.
Figure 14:
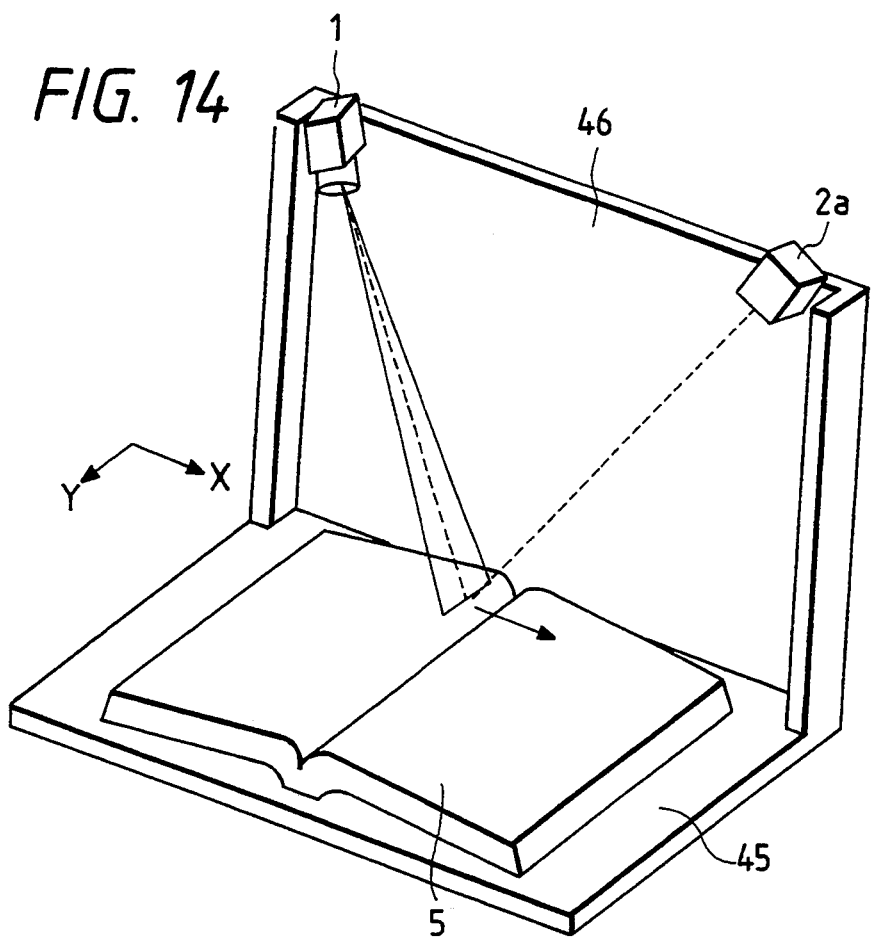
FIG. 14 is a perspective view showing an external appearance of the image reading apparatus of FIG. 13.

As shown in FIG. 13, the arrangement of the image reading apparatus may be roughly divided into an image reading section 1 for reading an image on a document original and the surface profile of the original, and a spot emitting section 2a for projecting a spot light on the surface of the original.

The image reading section 1 includes a solid state imaging device 3, which may be a charge coupled device (CCD), a drive processor 4 for controlling the solid state imaging device 3, and an imaging optical system 6 including a condenser for condensing reflecting light from a document original 5. The image reading section 1 further includes a focus control mechanism 37 for adjusting a focal distance of the imaging optical system 6 to the original 5 while the relative position of the solid state imaging device 3 to the imaging optical system 6 is kept constant, and a focus/image pickup controller 38 for controlling the focus control mechanism 37.

The spot emitting section 2a includes a light source 7 for emitting spot light, a rotating mirror 8 for reflecting the spot light from the light source 7, and a spot-light direction controller 9 for controlling the turn of the rotating mirror 8. The rotating mirror 8 is a polygon mirror shaped like a hexagonal prism. The reflected spot light from the polygon mirror 8 is projected on the solid state imaging device 3 in the image reading section 1. This will be described in detail later.

The image reading apparatus further includes a surface profile memory 15 for storing the data of the surface profile, which is calculated by a microprocessor 19 using the reflected spot light received by the image reading section 1. The surface profile calculation will be described in detail later.

A distorted-image processor 16 is provided for correcting the image signals using the surface profile data read out of the surface profile memory 15.

The external view of the image reading apparatus of FIG. 13 is perspectively illustrated in FIG. 14.

In the image reading apparatus of the third embodiment, a document original can be located on the platen glass in a state that the surface of the original to be read is faced upward. In the first and second embodiments already described, the original surface must be faced downward. The image reading apparatus includes a horizontal board 45 on which the original 5 is located, and a light shielding plate 46 standing up from the rear end of the horizontal board 45 (viewed in the drawing). The image reading section 1 and the spot emitting section 2a are mounted on the upper left and right corners of the light shielding plate 46, respectively. All of the components shown in FIG. 13 are not always contained in the image reading section 1, if it contains at least the solid state imaging device 3, the imaging optical system 6 and the focus control mechanism 37 and those are all turned in two directions being oriented at a right angle. In this case, the two directions are the X direction as indicated by a solid line with an arrow in FIG. 14 (viz., the width direction of the horizontal board 45, or the horizontal direction in the drawing) and the Y direction (viz., the depth direction of the horizontal board 45, or the direction orthogonal to the width direction). Thus, the image reading section 1 can be moved in the X and Y directions for scanning the original.

The spot emitting section 2a is contained in the case which is fastened, at a proper angle, to the upper right corner of the light shielding plate 46. Accordingly, the case per se is immovable. The polygon mirror 8 contained therein is rotated under control of the spot-light direction controller 9, so that the spot light hits a point on the surface of the original.

When the image reading section 1 reads the surface profile of the original, the image reading section 1 is turned (scanned) to aim at the point on the original surface that is hit by the spot light from the spot emitting section 2a (see FIG. 14).

Figure 15:
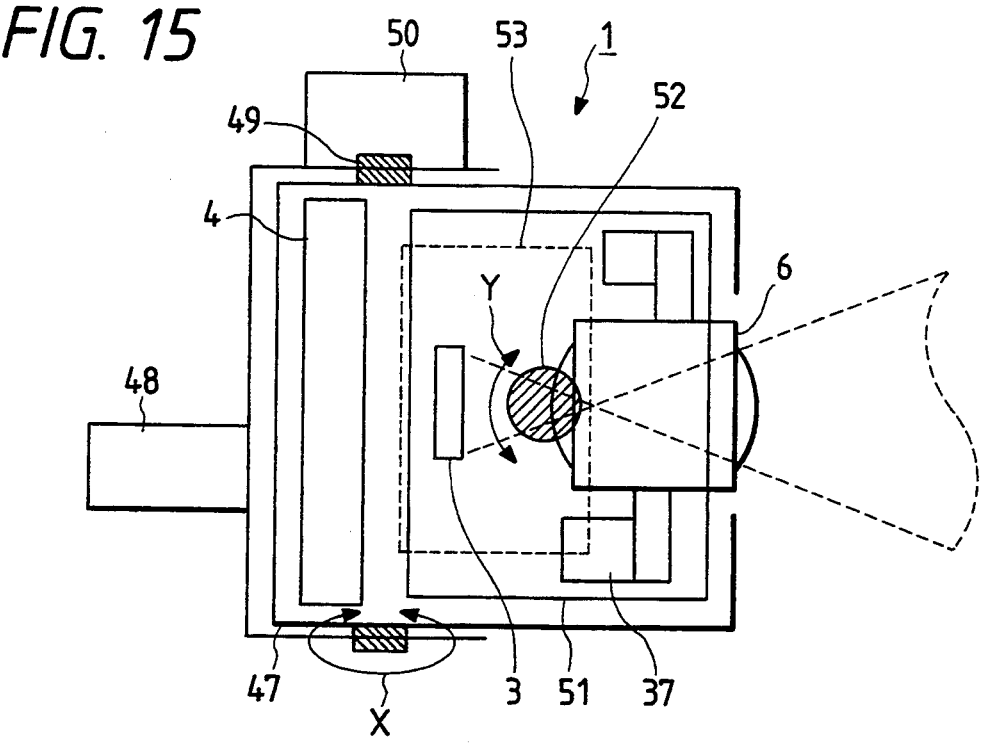
FIG. 15 is a plan view showing the construction of a scanning mechanism in the image reading section.

A specific example of the scanning mechanism of the image reading section 1 will be described with reference to FIG. 15. In the scanning mechanism, a horizontally-movable frame 47 is supported by a support 48. The horizontally-movable frame 47 is swung in the X direction about a horizontal scan shaft 49, which is turned by a horizontal scan mechanism 50 coupled therewith. The support 48 is fastened to the light shielding plate 46.

A vertically-movable frame 51 with a vertical scan shaft 52 fixed thereto is mounted on the horizontally-movable frame 47. A vertical scan mechanism 53 turns the vertical scan shaft 52 and hence the vertically-movable frame 51 in the Y direction. The solid state imaging device 3, the imaging optical system 6, the focus control mechanism 37, and the focus/image pickup controller 38 are mounted on the vertically-movable frame 51. The drive processor 4 is mounted on the horizontally-movable frame 47.

Figure 16:
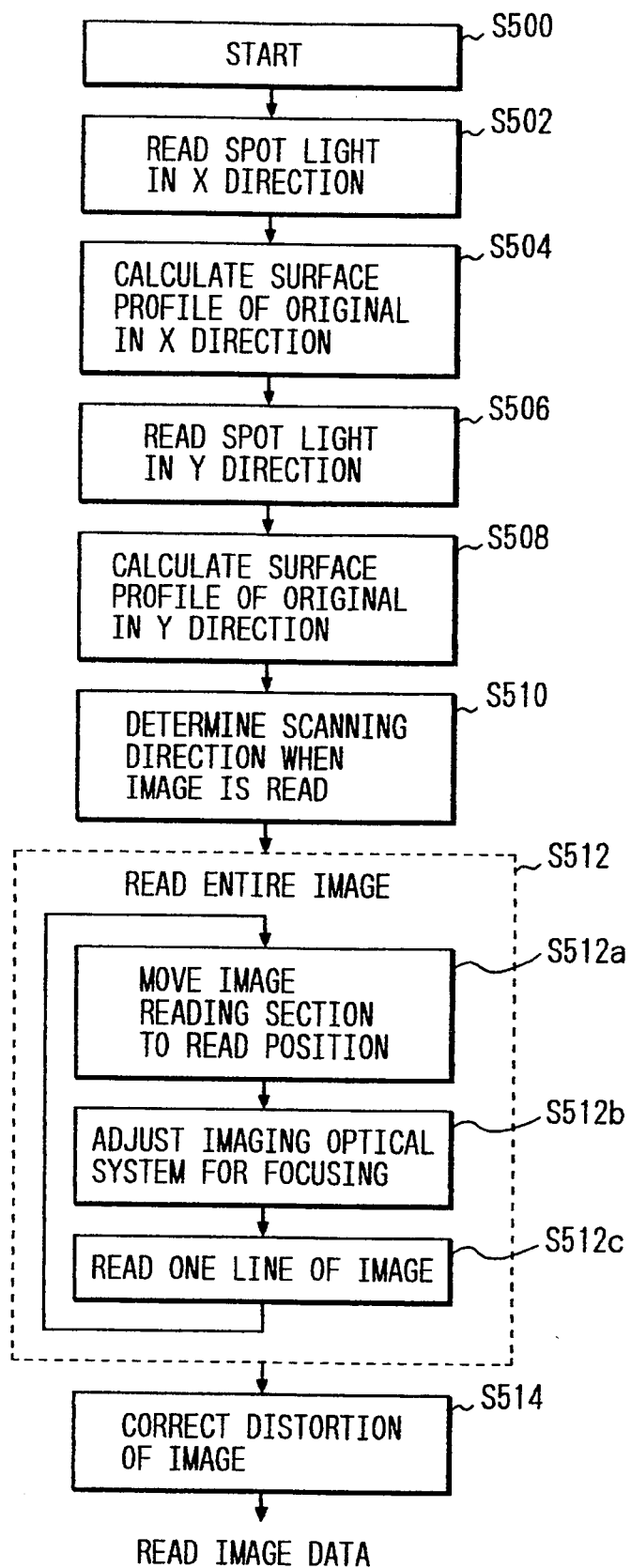
FIG. 16 is a flowchart showing a sequence of procedural steps for image reading and processing, which is performed by a microprocessor in the image reading apparatus of FIG. 13.

A sequence of procedural steps for the image reading and processing, which is performed by the microprocessor 19 in the image reading apparatus, will be described with reference to FIG. 16.

To start, the microprocessor 19 responds to a read start signal from a start switch, not shogun, that is pushed, to start the procedure for image reading and processing (step S500). The microprocessor 19 drives the light source 7 to emit a spot light. The spot light scans the original in the X direction by way of the rotating mirror 8. At the same time, the image reading section 1 is turned in synchronism with the movement of the spot light, to read the spot light reflected from the original in the X direction (step S502). In the next step S503, the surface profile of the original, viz., a profile of the contour of the original surface on the horizontal board 45, is calculated using the output signals of the solid state imaging device 3 which receives the reflected spot light.(see step-S502). The surface profile calculation will be described later. The results of the calculation is stored in the surface profile memory 15. The control by the microprocessor 19 advances to next step S506.

In step S506, the spot light is read in the Y direction, as in step S502. In step S508, the surface profile of the original in the Y direction is calculated as in step S504. The calculation results are stored in the surface profile memory 15.

Next step S510 determines the scanning direction for reading the original image by using the surface profile data of the X and Y directions, which are calculated in steps S504 and S508. In this instance of the embodiment, the direction in which the original surface has a great undulation is used as the scanning direction for the image reading operation. In a case where the original 5 is a book, as in FIG. 14, the X direction is the scanning direction.

In step S512, the image on the original is entirely read in the scanning direction as determined in step S510. In the instance, the original is repeatedly scanned in the X direction. The image reading section 1 is turned so that the light receiving surface of the solid state imaging device 3 faces the read start position (step S512a). At the read position, the focus of imaging optical system 6 to the original surface is adjusted. The imaging optical system 6 is moved for the focus adjustment by the focus/image pickup controller 38 according to the surface profile data (gained in steps S504 and S508).

Following the focus adjustment, the original image is read by one line in the X direction (step S512c). Then, the control returns to the step S512a, and repeats a similar read operation for the remaining lines of the image.

After completion of reading the entire image, the read image data is subjected to the distortion correction process (step S514), which is performed as already referred to in the description of the first embodiment. Then, the image data is output as the output image data of the image reading apparatus. In the flowchart as mentioned above, the spot light reading is performed in the X direction, but it may be performed in the Y direction.

The principle for calculating the surface profiles of the document original that is referred to in steps S504 and S508 in the flowchart of FIG. 16 will be described in detail with reference to FIG. 17.

Figure 17:
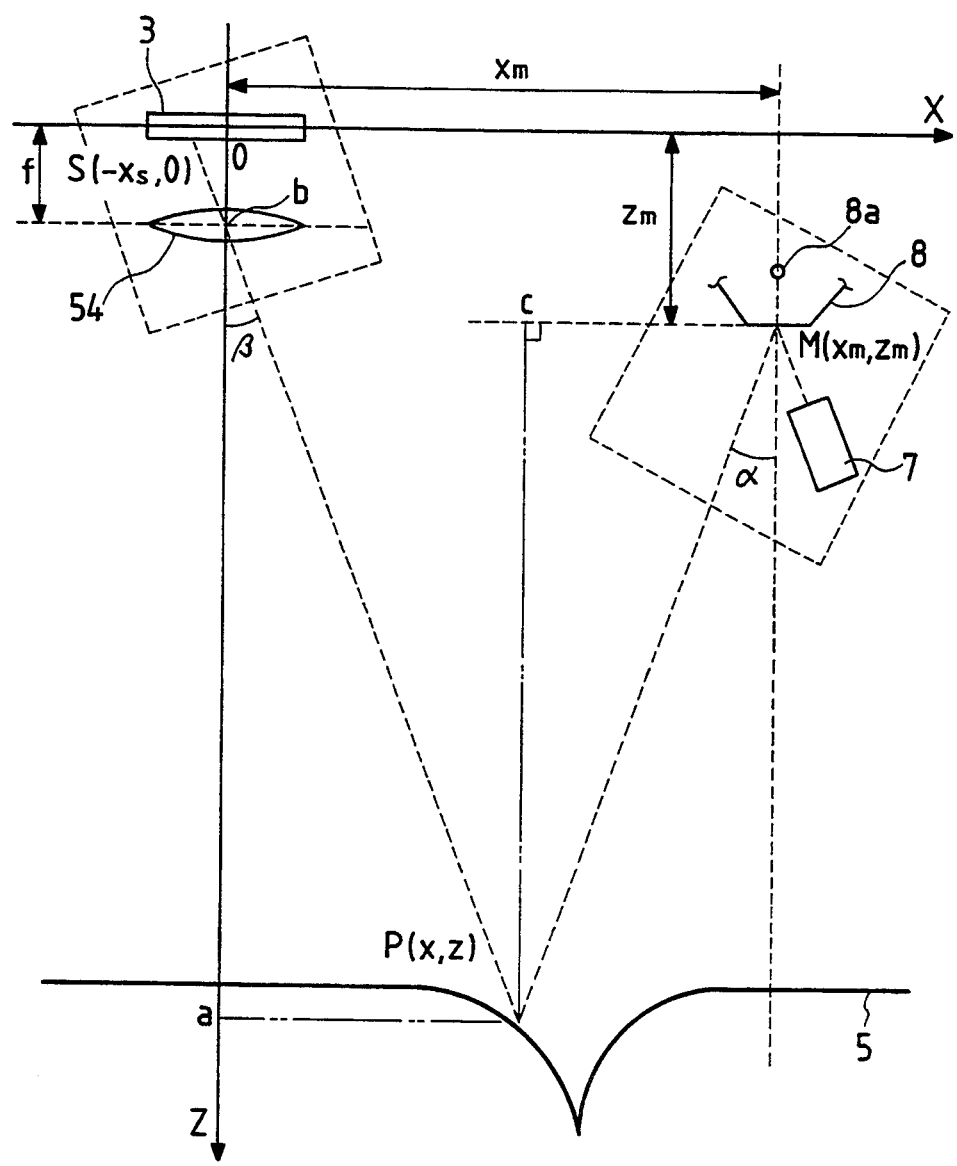
FIG. 17 is an explanatory diagram useful in explaining the calculation for obtaining the surface profile of a document original.
Figure 18:
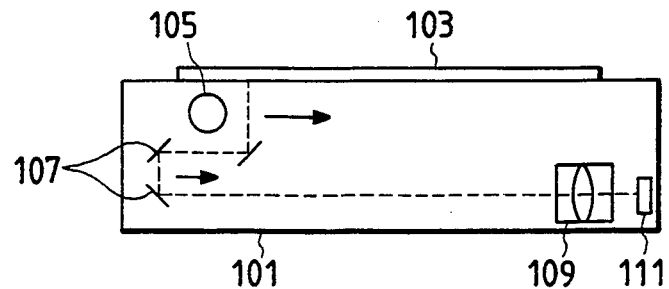
FIG. 18 is a side view showing the construction of a conventional image reading apparatus.
Figure 19:
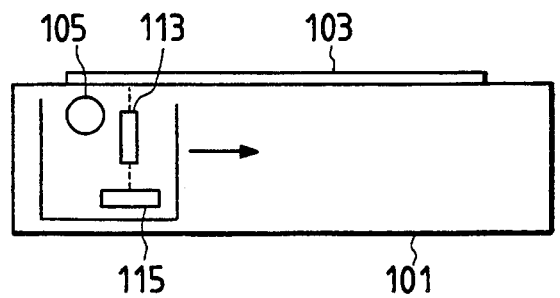
FIG. 19 is a side view showing the construction of another conventional image reading apparatus.
Figure 20:
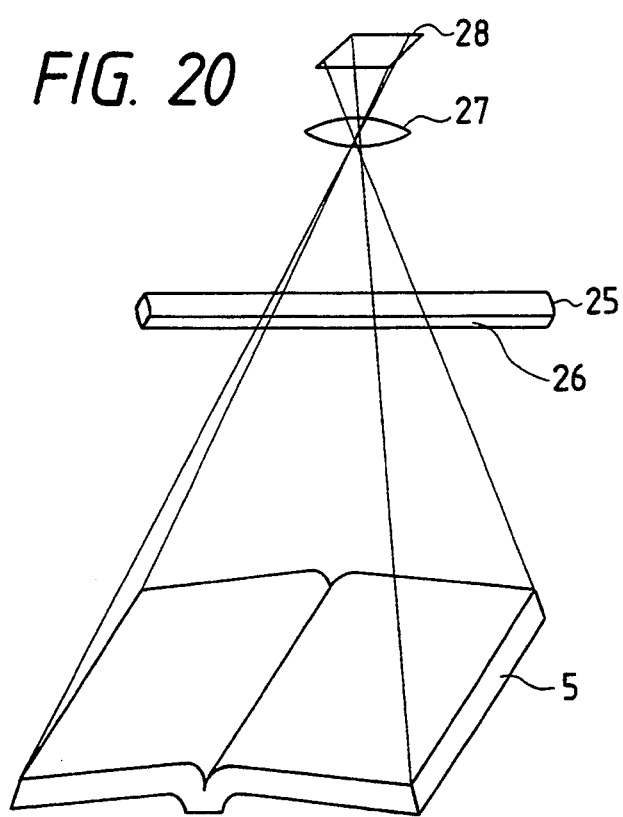
FIG. 20 is a perspective view showing the construction of a proposed image reading apparatus.

In FIG. 17, a profile, indicated by a bold solid line, located in the lower portion of the figure, indicates a contour of the surface of the original 5 placed on the horizontal board 45 when viewed in the Y direction.

A lens 54 and the solid state imaging device 3 of the second imaging optical system 6 are disposed such that the optical axis of the lens 54 passes through the center of the solid state imaging device 3.

In FIG. 17, the center of the solid state imaging device 3 lies at the origin of the two-dimensional coordinates defined by X and Z axes. The distance between the lens 54 and the solid state imaging device 3 as measured in the Z axis is denoted as f. In FIG. 17, a rotating shaft 8a of the polygon mirror 8 extends in the direction orthogonal to the surface of the drawing. A distance of the rotating shaft 8a from the origin in the X axis is denoted as $x_m$. A distance of the center of the mirrored facet of the polygon mirror from the origin in the Z axis is denoted as $y_m$. The center M or the reflecting point of the mirrored facet of the polygon mirror, by which a spot light from the light source 7 is reflected, is represented by the coordinates $(x_m, y_m)$.

The spot light is incident on the reflecting point M of the polygon mirror 8 and reflected at a reflecting angle α, and incident on the surface of the original. The incident point P on the original surface is expressed by the coordinates P(x, z). The incident point P also serves as a reflecting point. The spot light emanating from the reflecting point advances at an angle β to the Z axis, passes through the lens 54 and hits the surface of the solid state imaging device 3. The incident point on the surface of the device is expressed as $S(-x_s, 0)$. On the assumption as mentioned above, let us obtain the Z coordinate value of the incident point P on the original 5, viz., the distance z between the solid state imaging device 3 and the original 5.

The position $x_m$ of the rotating shaft 8a of the polygon mirror 8 on the X axis is the sum of the side Pa of a triangle Pab in FIG. 17 (here, b indicates the center point of the lens 54) and the side Mc of a triangle PcM. Then, we have $$x_m = (y-f)\tan\beta + (z-z_m)\tan\alpha \qquad (4)$$

where $$\tan\beta = x_x/f \qquad (5)$$

Rearranging the equation (4) for z and substituting the equation (5) into the rearranged equation, then we have $$z = (x_m - z_m \tan\alpha + x_s)/(\tan\alpha + x_s/f) \qquad (6)$$

The results of the calculation of the above equation are stored in the surface profile memory 15. In the step (S512b in FIG. 16) of the focal distance adjustment in the operation of reading the entire original image, the calculation results are read out of the memory and used for adjusting the distance from the imaging optical system 6 to the original 5. As a result, the image reading section 1 reads the image while keeping the best focal distance relative to the original.

As described above, before the image on the original is read, the spot emitting section 2a projects a spot light on the original surface, and the image reading section 1 reads the spot light reflected from the original. The surface profiles of the original are calculated using the read image signals. The results of the surface profile calculation are used for the focus adjustment of the imaging optical system. Accordingly, the original image can be read at the best focal conditions through the image reading operation. The distorted-image processor 16 extends the image data of the curved portion of the original on the basis of the calculated surface profiles, and optimumly sets up the image density of the extended image using the density difference between the densities of the image data near the extended image data. Accordingly, the image on the curved portion of the original can be reproduced at the proper density.

Thus, the image reading apparatus according to the third embodiment projects a spot light on the surface of the original, calculates the surface profiles of the original using the reflected spot light from the original, adjusts the focal distance of the optical system to the surface according to the surface profile data, extends the reduced image on the curved portion of the original to the image of the proper size using the surface profiles, and optimumly sets up the image density of the extended image using a quantity of change of the actual density of the image data near the extended image data. Accordingly, the image of the original can be read under the best focal conditions irrespective of the shape of the original. The image on the undulated or curved portion of the original, which is inevitably reduced, can be extended to the image of the proper size and at a proper density. Accordingly, the image reproduced by the image reading apparatus is clear and free of distortion.

The foregoing description of preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image reading apparatus having imaging optical means for imaging on a preset position light reflected from a surface of an object to be read, and image pickup means for picking up an optical image formed at the preset position to convert the optical image into electrical signals, said image reading apparatus comprising:

spot light projecting means for projecting a spot light at a desired position on the surface of said object;

reflected light receiving means for receiving the spot light reflected from the surface of said object to convert the spot light into an electrical signal corresponding to the quantity of the received spot light;

position calculating means for calculating a distance between a light receiving surface of said image pickup means and the surface of said object by using the output electrical signal of said reflected light receiving means;

focal-distance adjusting means for adjusting relative positions of said imaging optical means and said image pickup means to the surface of said object according to the results of the calculation by said position calculating means while keeping constant the distance between said imaging optical means and said image pickup means; and correcting means for extending image signals representative of an image region from a curved or undulated portion of the surface of said object according to the results of the calculation by said position calculating means to provide signals representative of extended image data for said portion, and for obtaining an optical density of the image region from the curved portion according to a density difference between the actual densities of image data near the extended image data.

2. The image reading apparatus according to claim 1, further comprising memory means for storing the results of the calculation by said position calculating means.

3. The image reading apparatus according to claim 1, wherein said spot light projecting means includes a light source for emitting a spot light, a rotating mirror for reflecting the spot light from said light source, and a direction controller for controlling the rotation of said rotating mirror.

4. The image reading apparatus according to claim 3, wherein said rotating mirror is a polygon mirror shaped like a hexagonal prism.

5. An image reading apparatus having imaging optical means for imaging on a preset position light reflected from a surface of an object to be read, and image pickup means for picking up an optical image formed at the preset position to convert the optical image into electrical signals, said image reading apparatus comprising:

spot light projecting means for projecting a spot light at a desired position on the surface of said object;

reflected light receiving means for receiving the spot light reflected from the surface of said object to convert the spot light into an electrical signal corresponding to the quantity of the received spot light;

position calculating means for calculating a distance between a light receiving surface of said image pickup means and the surface of said object by using the output electrical signal of said reflected light receiving means;

focal-distance adjusting means for adjusting relative positions of said imaging optical means and said image pickup means to the surface of said object according to the results of the calculation by said position calculating means while keeping constant the distance between said imaging optical means and said image pickup means; and means for determining read positions of said imaging optical means and said image pickup means according to previously stored values and according to the distance between the light receiving surface of said image pickup means and the surface of said object that is calculated by said position calculating means and driving the focal-distance adjustments according to the determined read positions to obtain a representation of the surface of the object with reduced distortion.

6. The image reading apparatus according to claim 5, further comprising memory means for storing the results of the calculation by said position calculating means.

7. The image reading apparatus according to claim 5, wherein said spot light projecting means includes a light source for emitting a spot light, a rotating mirror for reflecting the spot light from said light source, and a direction controller for controlling the rotation of said rotating mirror.

8. The image reading apparatus according to claim 7, wherein said rotating mirror is a polygon mirror shaped like a hexagonal prism.

9. An image reading apparatus comprising:

imaging optical means for imaging on a preset position light reflected from a surface of an object to be read;

image pickup means for picking up an optical image formed at the preset position to convert the optical image into electrical signals;

scanning means for turning the combination of said imaging optical means and said image pickup means in two directions orthogonal to each other while keeping the fixed relative position of said imaging optical means to said image pickup means;

spot light projecting means for projecting a spot light at a desired position on the surface of said object;

surface profile calculating means for calculating a profile of the surface of said object using the output signals of said image pickup means which receives the reflected spot light from said object;

focus adjusting means for adjusting the focal distance of said imaging optical means using the results of the calculation by said surface profile calculating means; and correcting means for extending image signals representative of an image region from a curved or undulated portion of the surface of said object according to the results of the calculation by said surface profile calculating means to provide signals representative of extended image data for said portion, and for obtaining an optical density of the image region from the curved portion according to a density difference between the actual densities of image data near the extended image data.

10. The image reading apparatus according to claim 9, further comprising memory means for storing the results of the calculation by said surface profile calculating means.

11. The image reading apparatus according to claim 9, wherein said spot light projecting means includes a light source for emitting a spot light, a rotating mirror for reflecting the spot light from said light source, and a direction controller for controlling the rotation of said rotating mirror.

12. The image reading apparatus according to claim 11, wherein said rotating mirror is a polygon mirror shaped like a hexagonal prism.

13. The image reading apparatus according to claim 9, wherein said scanning means includes a horizontally movable frame, and a vertically-movable frame mounted on said horizontally-movable frame.

14. The image reading apparatus according to claim 13, wherein said vertically-movable frame contains said imaging optical means and said image pickup means.

* * * * *